Dec. 1, 1953    F. S. AJERO    2,661,124
SEEDER AND PLANTER APPARATUS
Filed July 25, 1950    3 Sheets-Sheet 1
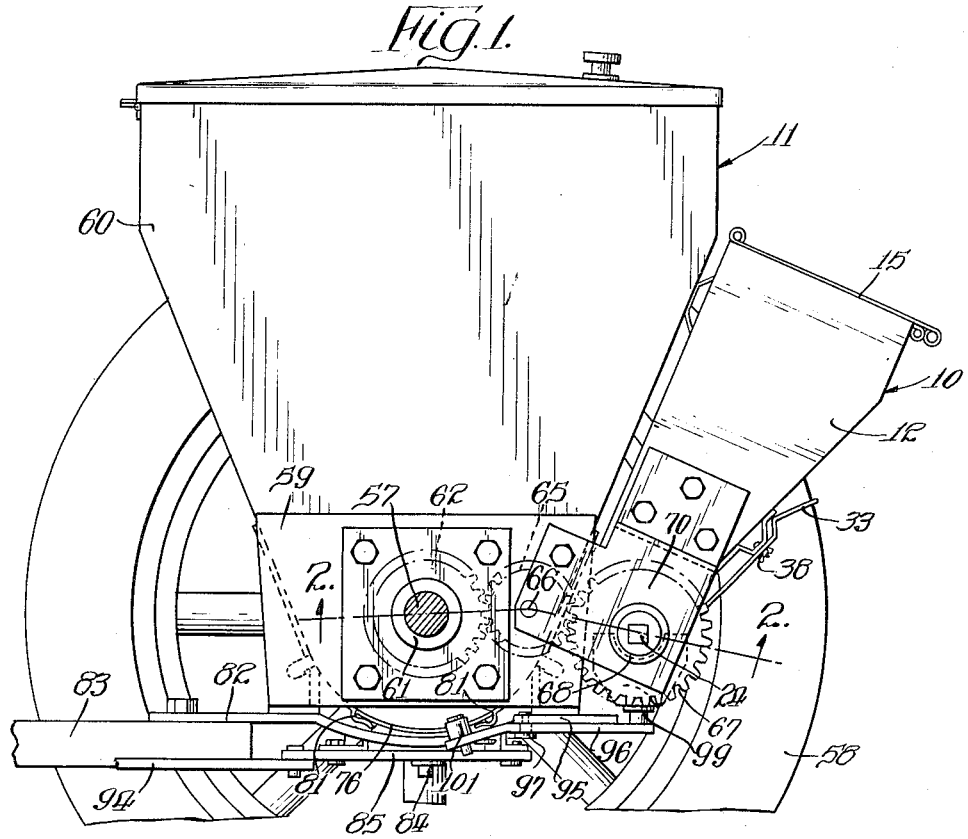
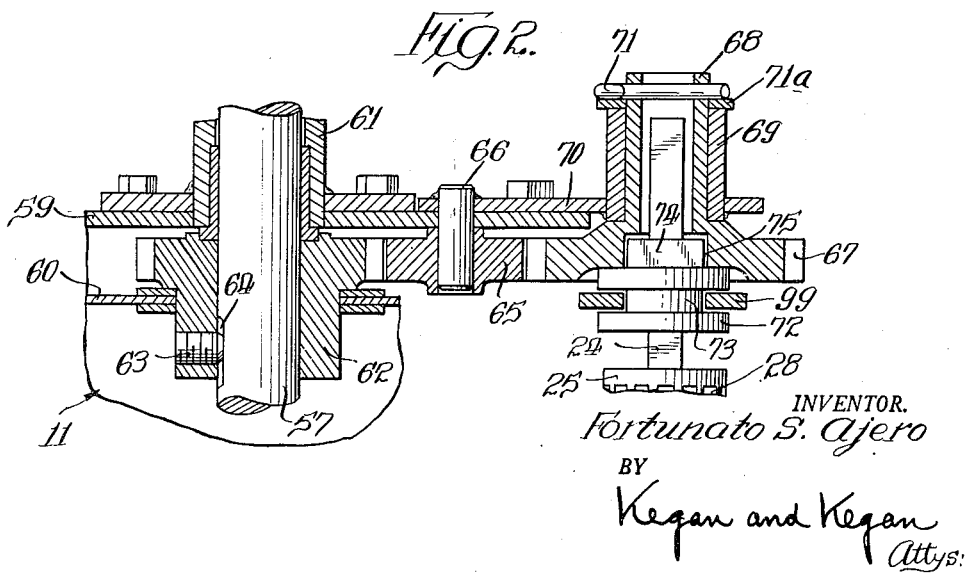
INVENTOR.
Fortunato S. Ajero
BY
Kegan and Kegan
Attys.

Dec. 1, 1953 F. S. AJERO 2,661,124
SEEDER AND PLANTER APPARATUS
Filed July 25, 1950 3 Sheets-Sheet 2
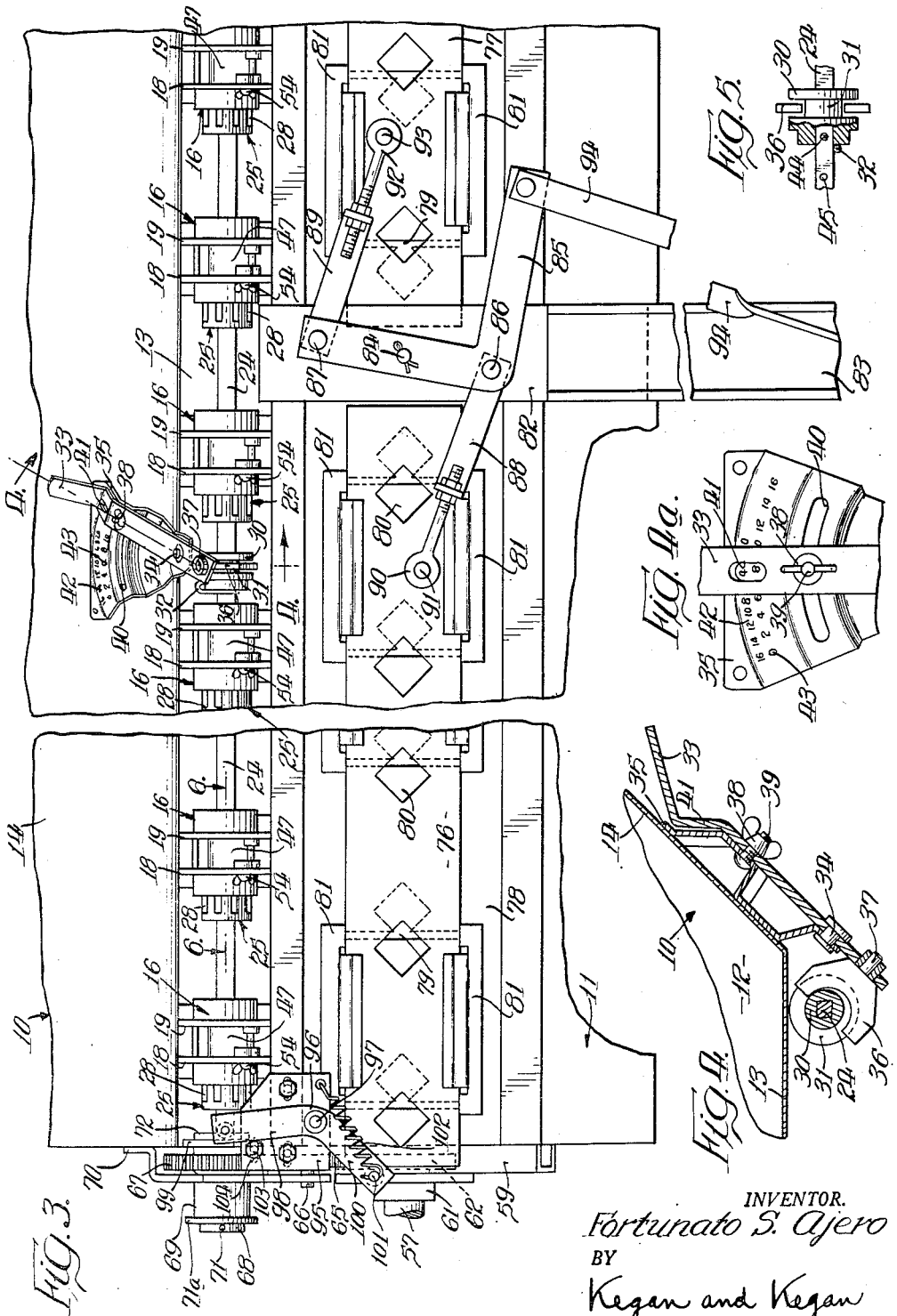
INVENTOR.
Fortunato S. Ajero
BY
Kegan and Kegan
Attys.

Dec. 1, 1953 F. S. AJERO 2,661,124
SEEDER AND PLANTER APPARATUS
Filed July 25, 1950 3 Sheets-Sheet 3
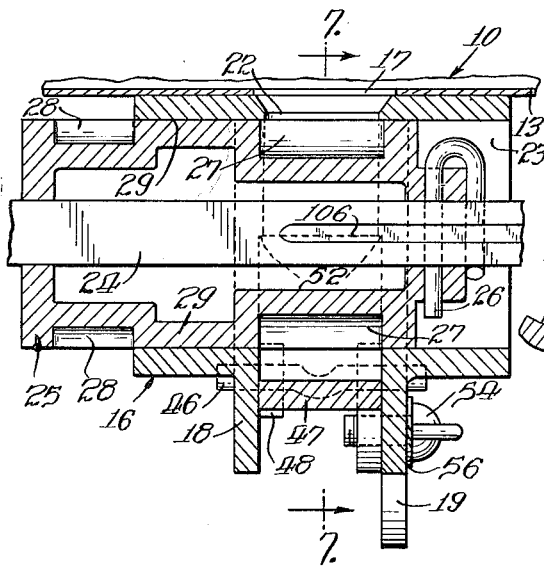
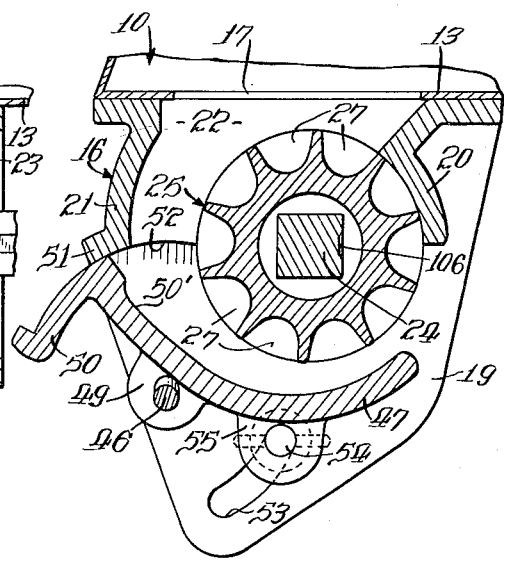
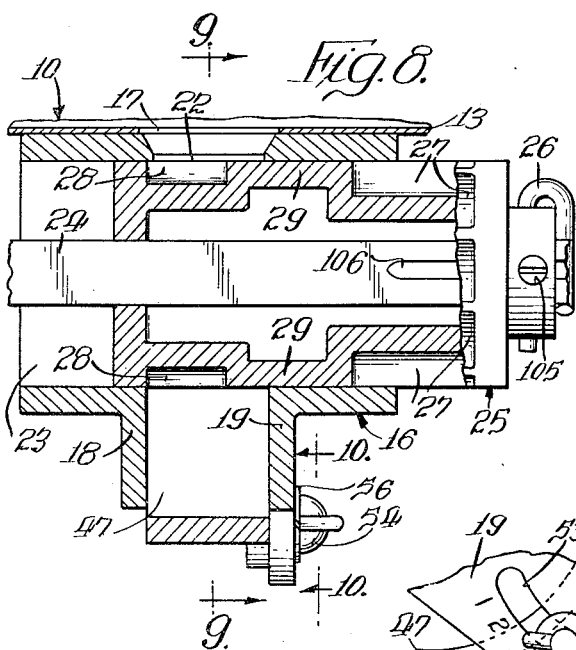
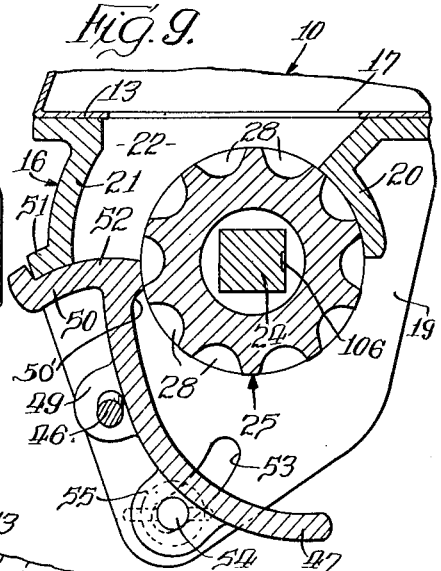
INVENTOR.
Fortunato S. Ajero
BY
Kegan and Kegan
Attys.

Patented Dec. 1, 1953

2,661,124

UNITED STATES PATENT OFFICE 2,661,124

SEEDER AND PLANTER APPARATUS

Fortunato S. Ajero, Chicago, Ill., assignor, by mesne assignments, to Avco Manufacturing Corporation, New York, N. Y., a corporation of Delaware Application July 25, 1950, Serial No. 175,766

7 Claims. (Cl. 222—177)

My invention relates generally to seeder and planter apparatus, and more particularly to such apparatus adapted for use in combination with fertilizer spreading apparatus.

A principal object of my invention is to provide an improved seeder and planter apparatus which is so constructed that it may be used to sow different kinds and sizes of seeds in varying quantities without crushing, breaking, or otherwise damaging them.

Another object of my invention is the provision of seeder and planter apparatus which can be used in combination with a conventional fertilizer spreader, but if desired can be readily disengaged when it is desired to use the fertilizer spreader only.

A further object of my invention is to provide seeder and planter apparatus of simple, dependable design, which may be easily set to discharge different sizes and kinds of seeds.

To the end of achieving the foregoing objects, my invention comprises, in its broad aspect, a hopper beneath which a housing is positioned, said housing having an inlet port therein communicating with the hopper, a feed member positioned in said housing, said housing including a wall section forming with the feed member a discharge throat, means for moving the feed member to impel seeds through said discharge throat, a chute positioned to receive the seeds as they are discharged from the throat, means for shifting the feed member relative to the housing to vary the capacity of said feed member, and means for adjustably positioning said chute relative to the feed member to vary the effective discharge area of said discharge throat.

In order that my invention may be more fully disclosed, reference is had to the accompanying drawings which illustrate one form of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 1 is a transverse sectional view, of a spreader and seed planter apparatus embodying my invention;

Figure 2 is a detail, fragmentary inverted plan view taken in section on the line 2—2 of Figure 1;

Figure 3 is a fragmentary bottom view of the apparatus rotated at 180° from the position in which it is shown in Fig. 1;

Figure 4 is a fragmentary side view taken in section on the line 4—4 of Figure 3;

Figure 4a is a fragmentary front view of the index plate and shift lever shown in Figure 4;

Figure 5 is a detail view partially in section of the shift mechanism for adjusting the seed distributor to handle seeds of different sizes and kinds;

Figure 6 is a fragmentary front view taken in section on the line 6—6 of Figure 3;

Figure 7 is a side view taken in section on the line 7—7 of Figure 6;

Figure 8 is a view similar to Figure 6, except that the feed member and distributor shaft have been shifted longitudinally relative to the housing;

Figure 9 is a side view taken in section on the line 9—9 of Figure 8; and

Figure 10 is a fragmentary side view taken in section on the line 10—10 of Figure 8.

Like reference characters designate like parts in the drawings, and in the description of my invention which follows hereafter.

Turning now to the drawings, and more particularly to Figure 1 thereof, my seeder and planter apparatus is shown as including a seed supply bin 10 which is secured to a fertilizer supply hopper 11 of a tractile vehicle. The bin 10 is formed with end walls 12, 12, a bottom plate 13 (Figure 3), a front panel 14, Fig. 4, and a hinged lid 15 which covers an opening whereby seeds and the like may be loaded into the bin 10. Referring now to Figures 3, 6 and 7, a plurality of feed cup housings indicated generally by the numeral 16, are secured to the bottom plate 13, in registration with openings 17 therein. Each of the housings 16 includes two throat defining side walls 18 and 19, a curved rear wall segment 20 and an opposite front wall segment 21 forming a discharge throat or passageway 22. A cylindrical bore 23 extends through each of the housings 16, flanked beyond the end walls 18 and 19 by sleeve flanges.

A shaft 24 of substantially square cross section extends through the alignment of bores 23 of the several housings 16. A plurality of feed rolls, each indicated generally by the numeral 25, are keyed to the shaft 24 by the drive or cotter pins 26. To alter the axial position of any feed roll 25 relative to the shaft 24, its pin 26 is removed, and instead the feed roll 25 locked at the desired position by means of a set screw 105 tightened while in the groove or keyway 106 (Figure 8). Each of the feed rolls 25 includes a first longitudinally fluted disc 27 (Figure 7), and a second longitudinally fluted disc 28 (Figure 9), the two sets of flutes 27 and 28 being separated by a cylindrical vane or disc portion 29. In the embodiment of the drawings, the depth or volume of each of the flutes 27 is considerably greater than that of each of the flutes 28, for a purpose to be more fully disclosed below.

As best shown in Figures 3, 4 and 5, a collar 30 having an annular groove 31 therein, is secured to the shaft 24 by the pin 32. The axial position of the collar 30, and consequently the position of the shaft 24, can be changed by shifting the lever 33 about its pivot 34 and relative to the index plate 35. A yoke 36 is pivoted to the lower end of the lever 33 by means of a pintle 37, and it rides the annular groove 31 of the collar 30. The lever 33 may be latchable in any desired position relative to the index plate 35, such as by tightening down the wing nut 38 on the fastener 39, which protrudes through the arcuate slot 40. The lever 33 is also provided with a window 41 through which to observe the setting of lever 33 in respect to the scale readings of the upper scale 42 (fine seeds) or lower scale 43 (coarse seeds). As shown in Figure 4a, the upper scale 42 and lower scale 43 are in reverse order, while the upper scale 42 does not extend the full length of the lower scale 43, all for a purpose to be more fully discussed below.

Referring now to Figure 5, the collar 30 is alternatively securable to the shaft 24 in accordance with the location of the pin 32 of hole 45. In each adjustment, the lever 33 can be used to shift the position of the shaft 24, bringing the flutes 27 or 28 into alignment with the discharge passageway 22 (Figure 8), so that fine seeds can be dispensed.

Referring now to Figures 6 and 7, a hinge pin 46 extends between the end walls 18 and 19. A chute 47 is positioned between the two end walls 18 and 19, and pivotally secured to the hinged pin 46 at the stud portions 48 and 49. The upper end of the chute 47 is provided with a segmental gate portion 50, the center of curvature of which is coincident with the pivotal axis of the hinge pin 46. Below the gate portion 50, chute 47 is undercut as at 50', Figs. 7 and 9, so that when the chute is placed into the position shown in Fig. 9, its encounter with successive flute apertures 27 or 28 will permit seed quantities trapped therein to roll out beyond the undercut portion 50' rather than to be crushed under such circumstances of adjustment. The gate portion 50 is in sliding contact with the lower edge portion 51 of the wall 21. In addition, each of the walls 18 and 19 includes an overhanging ledge 52 corresponding in curvature to the gate portion 50. An arcuate positioning slot 53 is formed in the end wall 19, the center of curvature of said slot 53 being coincident with the axis of the hinge pin 46. A thumb screw 54 extends through the positioning slot 53 into the tapped boss 55 on the chute 47. A lock washer 56 locks the thumb screw 54 in place, once it is tightened down.

In the embodiment shown, the drive for the shaft 24 is taken off of the axle shaft 57 of the hopper 11, which in turn is driven through rubber-tired wheels 58, only one of which is shown. A channel 59 is secured to the end wall 60 of the hopper 11, and supports a bearing sleeve 61 for the outer end of the shaft 57. A first spur gear 62 is secured to the axle shaft 57 by the set screw 63 which registers with the flat 64 in the shaft 57. An idler gear 65 on the pintle 66 is meshed with the spur gear 62, and in turn drives the spur gear 67 formed integrally with the hub 68. Said hub 68 is rotatable in the bearing sleeve 69 secured to the plate 70, which plate is in turn fastened to the channel 59 and the bin 10. A cotter pin 71 and thrust washer 71a prevent lateral movement between the hub 68 and the bearing sleeve 69. The shaft 24 extends into the hub 68, and is provided with a collar 72 having an annular groove 73 therein, and a clutch jaw portion 74 of substantially square cross-section. Said jaw portion 74 couples the collar 72 to the hub 68. When the collar 72 is in the position shown in Figure 2, therefore, the shaft 24 is driven by the axle shaft 57, and turns in the same direction therewith.

In Figure 3 is shown a pair of shutters 76 and 77 slidable along the bottom plate 78 exposing a series of discharge ports 79 formed therein. Each of the shutters 76 and 77 includes a plurality of apertures 80 which are registrable with the discharge ports 79 in varying degrees. A plurality of guide members 28 are spaced along the bottom plate 78 and act to support and guide the shutters 76 and 77. Referring now to both Figures 1 and 3, a center bridging member 82 is secured beneath the hopper 11, while a drawbar 83 extends from one end thereof. A stud 84 projects downwardly from the bridging member 82, and serves as a pivot about which the bell crank 85 rotates. Two pivot pins 86 and 87 are carried by the bell crank 85 eccentric of the stud 84, and are pivotally connected to the links 88 and 89, respectively. An eye bolt 90 adjustably secured to the link 88 connects said link to the pin 91 on the shutter 76, while a corresponding eye bolt 92 is connected to the pin 93 on the shutter 77.

Upon turning the bell crank 85 in a counter clockwise direction, as viewed in Figure 3, it is apparent that each of the shutters 76 and 77 moves toward the bridging member 82, to open the discharge ports 79. The bell crank 85 may be turned in this manner through movement of the connecting rod 94 and actuating linkage not shown. Secured to the hopper 11 adjacent to the channel 59, is a plate 95. A bell crank 96 is pivotally secured to the plate 95 on the pintle 97. The arm 98 of the bell crank 96 carries a yoke 99 thereon, for engagement with the clutch collar 72. The other arm 100 of the bell crank 96 is provided with a roller 101, which is in alignment with the end of the shutter 76. A helical spring 102 interconnects the arm 100 and the plate 95, and urges the bell crank 96 in a counterclockwise direction, as viewed in Figure 3. Thus, as the shutter 76 is moved toward the center bridging member 82, the spring 102 acts to engage the jaw portion 74 of the clutch collar 72 with the recess 75 in the hub 68. A stop member 103 adjustably positionable along the slot 104 in the plate 95, limits rotational movement of the bell crank 96 under the influence of the spring 102.

*Operation of apparatus*

As the machine is moved over the ground, the rotating wheels 58 turn the shaft 57, whereupon the spur gear 67 of the hub 68 is driven through the idler gear 65. As long as the shutters 76 and 77 are closed, however, neither fertilizer nor seeds are discharged from the machine. With the shutters 76 and 77 in the closed position, the shaft 24 cannot turn, since the bell crank 96 is maintained in a position wherein the clutch collar 72 is disengaged from the recess 75 in the hub 68.

As soon as the shutters 76 and 77 are open to the smallest setting, the bell crank 96 is turned in a counterclockwise direction as viewed in Figure 3, to move the clutch collar 72 toward the recess 75. In one commercial embodiment of my invention, the shutters 76 and 77 displace approximately 3/8 inch toward the center bridging member 82, as they are set to provide the smallest effective discharge area. When this occurs, the clutch collar 72 moves approximately 1/2 inch, to engage the clutch jaw 74 with the recess 75, and drivably connect the collar 72 with the hub 68. If the shutters 76 and 77 are opened additionally this has no effect upon the position of the bell crank 96 and the collar 72, since the stop member 103 prevents additional movement of the bell crank 96. As soon as the clutch collar 72 is drivably engaged with the hub 68, the shaft 24 commences to rotate, thereby turning the feed rolls 25.

Advantageously, my apparatus provides means for securing a wide range of discharge rates for different sizes of seeds and the like. To set the apparatus to discharge coarse seeds, such as for example rice, corn, lima beans, or soya beans, the collar 30 is positioned on the shaft 24 in the position shown in Figure 5, in which position the large flutes 28 are aligned with the discharge passageway 22. For most of these large seeds and grains, the chute 47 is set in the position shown in Figure 7, i. e. the thumb screw 54 is aligned with the numeral "1" (Figure 10). This setting of the chute 47 provides in most cases sufficient clearance for the larger seeds as they are propelled along the chute 47 by the large flutes 27 of the feed roll 25. To vary the rate at which the seeds are dispensed from the housing 16, the feed roll 25 is shifted in the bores 23 relative to the discharge passageway 22, to vary the amount of the large flutes 27 which are exposed. Thus, referring to Figure 6, as the feed roll 25 is shifted to the right, the land portion 29 is progressively aligned with the discharge passageway 22, and the effective capacity of the large flutes 27 is correspondingly reduced. To set the feed roll 25 at the position which yields the desired rate of discharge, the operator loosens the wing nut 38 and swings the lever 33 until the window 41 is aligned with that indicium on the upper scale 42 corresponding to the desired rate of flow. When this position is reached, the operator then tightens the wing nut 38 on the fastener 39, to hold the lever 33 in this position.

In the event that the seeds are too large to flow freely through the constricted area between the feed roll 25 and the lower end of the chute 47, this area may be enlarged by setting the chute 47 in a position intermediate those shown in Figures 7 and 9. Thus, for example, where such large seeds as soya beans are being sown, it may be necessary to align the thumb screw 54 with the numeral "2" or "3" on the plate 19 (Figure 10). While movement of the chute 47 may also be used to give different rates of flow for any one size of seeds, it is normally more convenient and accurate to obtain this setting through the media of the lever 33 and the graduated plate 35.

To set my apparatus to discharge fine seeds, such as for example ladino clover, alfalfa, timothy, and blue grass, two adjustments are made. First, the feed roll 25 is shifted along the bore 23 to the position shown in Figure 8. This is accomplished preferably by moving the lever 33 to the left, as viewed in Figure 3, until it is aligned with the "0" reading of the lower scale 43, removing the pin 32, sliding the collar 30 to the left (whereupon the lever 33 moves to the right), and inserting the pin 32 in the hole 45. When this is done the discharge passageway 22 is closed; however, by moving the lever 33 once again to the left the small flutes 28 can be aligned in varying degree with the passageway 22. Secondly, the chute 47 is moved to the position shown in Figure 9, by loosening the thumb screw 54 and thereafter aligning it with the mark "F.S" shown in Figure 10. This brings the segmental gate portion 50 into sliding contact with the outer periphery of the feed roll 25; hence the discharge rate is controlled by the size and effective length of the small flutes 28, rather than being controlled in part by the chute 47 as in the case of the arrangement of Figure 7. Leakage of fine seeds between the chute 47 and the end walls 18 and 19 is prevented by the overhanging ledges 52, 52, which mate with the gate portion 50. To change the rate at which the seeds are discharged, using the arrangement of Figures 8 and 9, the lever 33 is moved relative to the lower scale 43 on the graduated plate 35, to a setting commensurate with the desired rate of discharge.

Thus, the apparatus shown provides for the discharge of different sizes of seeds over a wide range of rates of discharge. Through the adjustability of the chute 47, the apparatus may be either set to control the discharge at the lower end of the chute 47, as shown in Figure 7, or else set to control the discharge at the gate portion 50, as shown in Figure 9. This feature is particularly desirable since it enables the dispensing of seeds of widely divergent sizes without crushing or breaking the large ones and without sacrificing close control over rates of discharge in the case of small seeds. It will also be noted that as the discharge throat—namely, the clearance between the gate portion 50 and the feed roll 25—is increased, that the lower end of the chute 47 moves toward the roll 25. On the other hand, when the discharge throat is closed by the gate portion 50, the lower end of the chute 47 merely acts as a guide member for the seeds dropping from the flutes 28.

In the event that it is desired to stop the operation of the seeder apparatus without interfering with the normal operation of the fertilizer spreader, the shaft 24 can be disconnected from the sleeve 68 merely by moving the stop member 103 along the slot 104 to prevent the clutch collar 72 from moving into engagement with the recess 75 in the hub 68. Advantageously, if desired certain of the discharge passageways 22 may be shut off, while others remain open for dispensing seeds and the like. For example, if the operator desires to shut off the passageway 22 of Figure 8 without disturbing the position of the shaft 24, he merely removes the pin 26 and moves the feed roll 25 to the left until the land 29 is aligned with the passageway 22, whereupon the feed roll 25 may be locked in the inoperative position by means of the set screw 105.

While in the embodiment shown in the drawings, all of the feed rolls 25 are rotated by a single shaft 24, it will be apparent that if desired a portion of the feed rolls may be driven off of one wheel 53, while the remainder are driven off of the other wheel. This arrangement has the added advantage that as the machine is moved along an arc, as when turning a corner, the outer swinging wheel turns more rapidly than the inner pivoting wheel, so that a more uniform distribution of seeds is obtained. Another advantage of this differential drive arrangement is that the maximum twisting force on each of the shafts 24 is only about one-half of that which is placed on the shaft 24 of the embodiment of the drawings. The principle of operation of this modification is of course no different from that shown in the drawings.

While my seeder and planter apparatus is particularly well suited for use in combination with fertilizer spreaders, it will be apparent that it may be used independently of such apparatus, if desired, or in combination with other types of implements.

What is claimed is:

1. Seeder apparatus including a housing having a passageway therethrough and a cylindrical bore intersecting said passageway, a drive shaft extending through said bore, a feed roll secured to said drive shaft and including two separate sets of circumferentially spaced longitudinal flutes separated by a land, said cylindrical bore disposed relative to said passageway to position said feed roll to one side of said passageway, whereby a discharge throat is formed, means for turning said feed roll, a collar on said drive shaft having an annular groove therein, a pivoted lever on said apparatus including a yoke on one end thereof drivably engaging said annular groove on said collar, whereby said roll may be shifted relative to said passageway, means for changing the position of said collar relative to said shaft, whereby different sets of flutes can be aligned with said discharge passageway, a chute positioned to receive seeds and the like dispensed through said discharge throat, and means for adjusting the position of the ingress end of said chute relative to said feed roll to vary the effective discharge area of said discharge throat.

2. The combination with a fertilizer spreader including a wheel supported hopper having a discharge port therein, an axle shaft, a shutter plate and means for opening and closing said shutter plate, of seeder apparatus comprising a seed bin having a discharge opening therein, a housing positioned below said seed bin and having a passageway aligned with said discharge opening, said housing further having a cylindrical bore therethrough intersecting said passageway, a shaft extending through said cylindrical bore and a feed roll secured thereto, said cylindrical bore disposed relative to said passageway to position said feed roll to one side of said passageway, whereby a discharge throat is formed, a chute positioned to receive seeds dispensed through said discharge throat, and means for adjusting the position of said chute relative to said feed roll to vary the effective discharge area of said discharge throat, a member driven by said axle shaft of said spreader, releasable clutch means between said member and said feed roll shaft, and clutch actuating mechanism drivably connected to said shutter plate to engage said clutch means upon moving said shutter plate to uncover said discharge port.

3. Apparatus of the type defined in claim 2, wherein said releasable clutch means is a jaw clutch.

4. Apparatus of the type defined in claim 2, wherein said clutch actuating mechanism comprises: a pivoted bellcrank, a yoke secured to one arm of said bell crank and drivably engaged with said clutch means, a lug member secured to the other arm of said bell crank and positioned in alignment with one end of said shutter plate, said shutter plate holding said clutch means in the disengaged position when said discharge port is covered, and spring means urging said bell crank to engage said chute means as said shutter plate is moved to uncover said discharge port.

5. In a feed cup attachment for drills or planters, a principal housing formed to provide a horizontal cylindrical portion having a concentric bore therethrough and a transverse throat chamber portion offset with respect to said bore and defined by partitioning walls transverse to said cylindrical portion, said throat chamber portion extending part way down one side of said bore and terminating with a downwardly concave cylindrical under surface, a throat chamber defining chute, having pivot means in said partitioning walls positioned concentrically with said under surface, said chute having a barrier gate segment on one side of said pivot means, which segment has wiping engagement with said under surface and is shiftable as said chute is pivoted between obstructing and passing positions respecting said throat chamber and said chute also having a wall portion on the opposite side of said pivot means, so that inward movement of the barrier gate segment causes outward movement of said wall portion, and a rotor supported in said bore so as to be continuously rotatable and longitudinally shiftable into alternative positions, said rotor having a plurality of cylindrical sections in which are formed fluted chambers of predetermined volume capacity whereby aligning any of said cylindrical sections with said throat chamber adjustment of feed capacity may be regulated.

6. Seeder apparatus including a housing having a passageway therethrough and a cylindrical bore intersecting said passageway, a feed roll turnable in said cylindrical bore and including two longitudinally spaced sets of circumferentially spaced longitudinal flutes, said sets being separated by a land and said cylindrical bore being disposed relative to said passageway to position said feed roll to one side of said passageway, whereby a discharge throat is formed, a drive shaft for said feed roll, means to secure said feed roll to said drive shaft in a longitudinally adjustable manner, means to turn said drive shaft with the feed roll, means to shift said drive shaft longitudinally for shifting said feed roll relative to said bore to bring either of said sets of flutes into a predetermined degree of alignment with said passageway, and a chute positioned to receive seeds and the like dispensed through said discharge throat.

7. Seeder apparatus including a housing having a passageway therethrough and a cylindrical bore intersecting said passageway, a feed roll turnable in said cylindrical bore and including circumferentially spaced longitudinal flutes, said cylindrical bore being disposed relative to said passageway to position said feed roll to one side of said passageway, whereby a discharge throat is formed, a drive shaft for said feed roll, means to turn said drive shaft with the feed roll, and a chute positioned to receive seeds and the like dispensed through said discharge throat and having a pivotal axis parallel with said drive shaft, said axis being located between the upper and lower edges of the chute so that inward movement of the upper edge causes outward movement of the lower edge of the chute.

FORTUNATO S. AJERO.

References Cited in the file of this patent

UNITED STATES PATENTS

| Number | Name | Date |
|---|---|---|
| Re. 7,926 | Winchell | Oct. 23, 1877 |
| 208,599 | Hildrup et al. | Oct. 1, 1878 |
| 521,542 | Johnson | June 19, 1894 |
| 547,016 | Kimball | Oct. 1, 1895 |
| 659,367 | Galloway | Oct. 9, 1900 |
| 743,949 | Stevens | Nov. 10, 1903 |
| 1,051,958 | Jones et al. | Feb. 4, 1913 |
| 1,168,859 | Compton | Jan. 18, 1916 |
| 1,178,571 | Bozard | Apr. 11, 1916 |
| 1,291,151 | Robinson | Jan. 14, 1919 |
| 1,521,014 | Draver | Dec. 30, 1924 |
| 1,637,834 | Oliver | Aug. 2, 1927 |
| 2,242,093 | Stauffacher | May 13, 1941 |
| 2,510,231 | Juzwiak | June 6, 1950 |